Jan. 3, 1961 J. B. ROCHE 2,966,842
BRIQUETTING MACHINES
Filed May 5, 1958 3 Sheets-Sheet 3
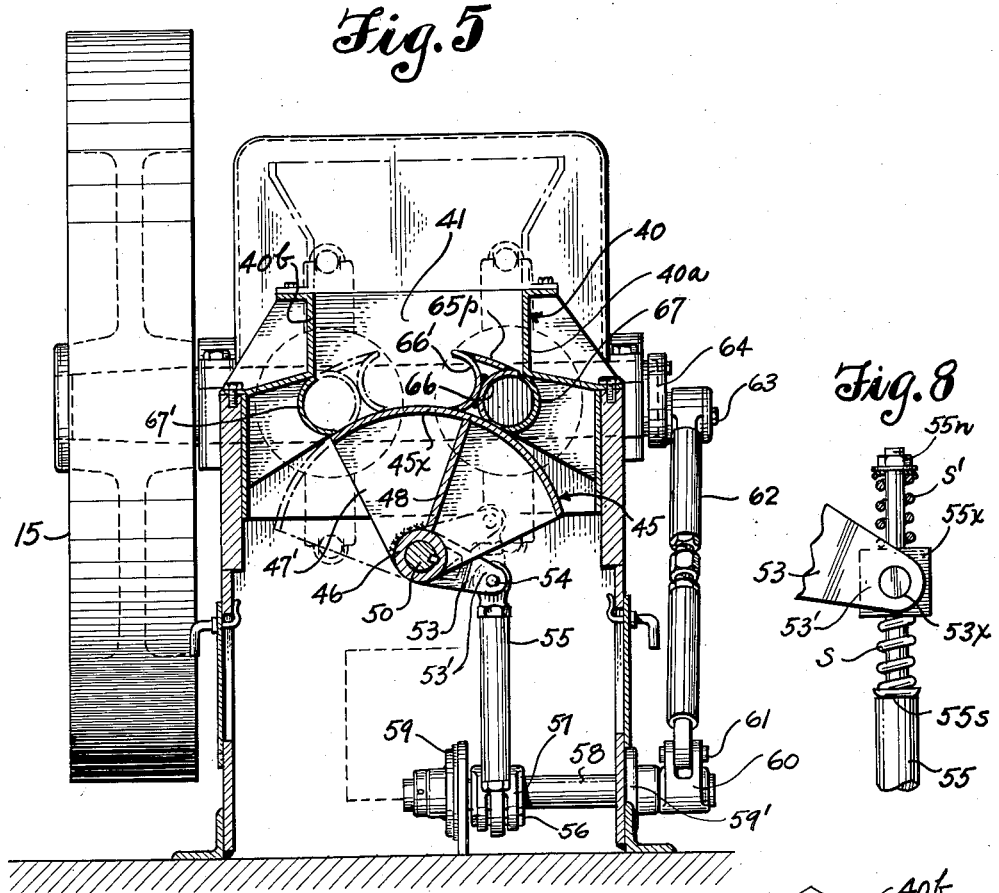
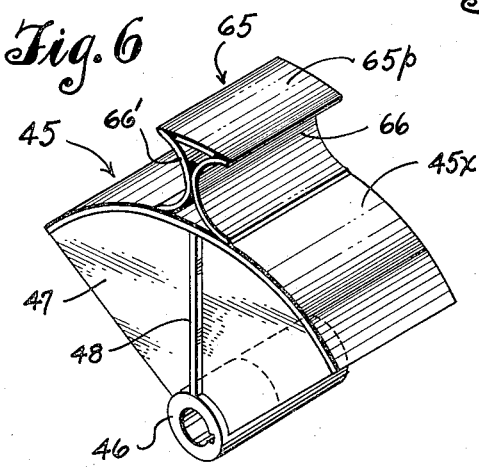
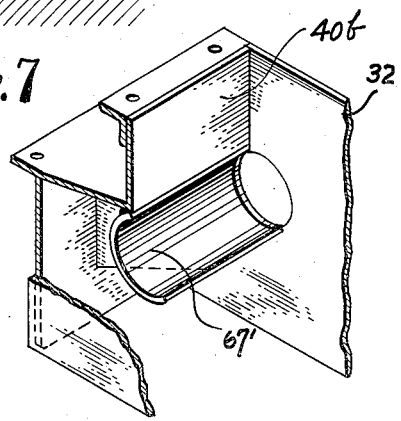
INVENTOR.
JAMES B. ROCHE
BY
Robinson & Berry
ATTORNEYS

United States Patent Office 2,966,842
Patented Jan. 3, 1961

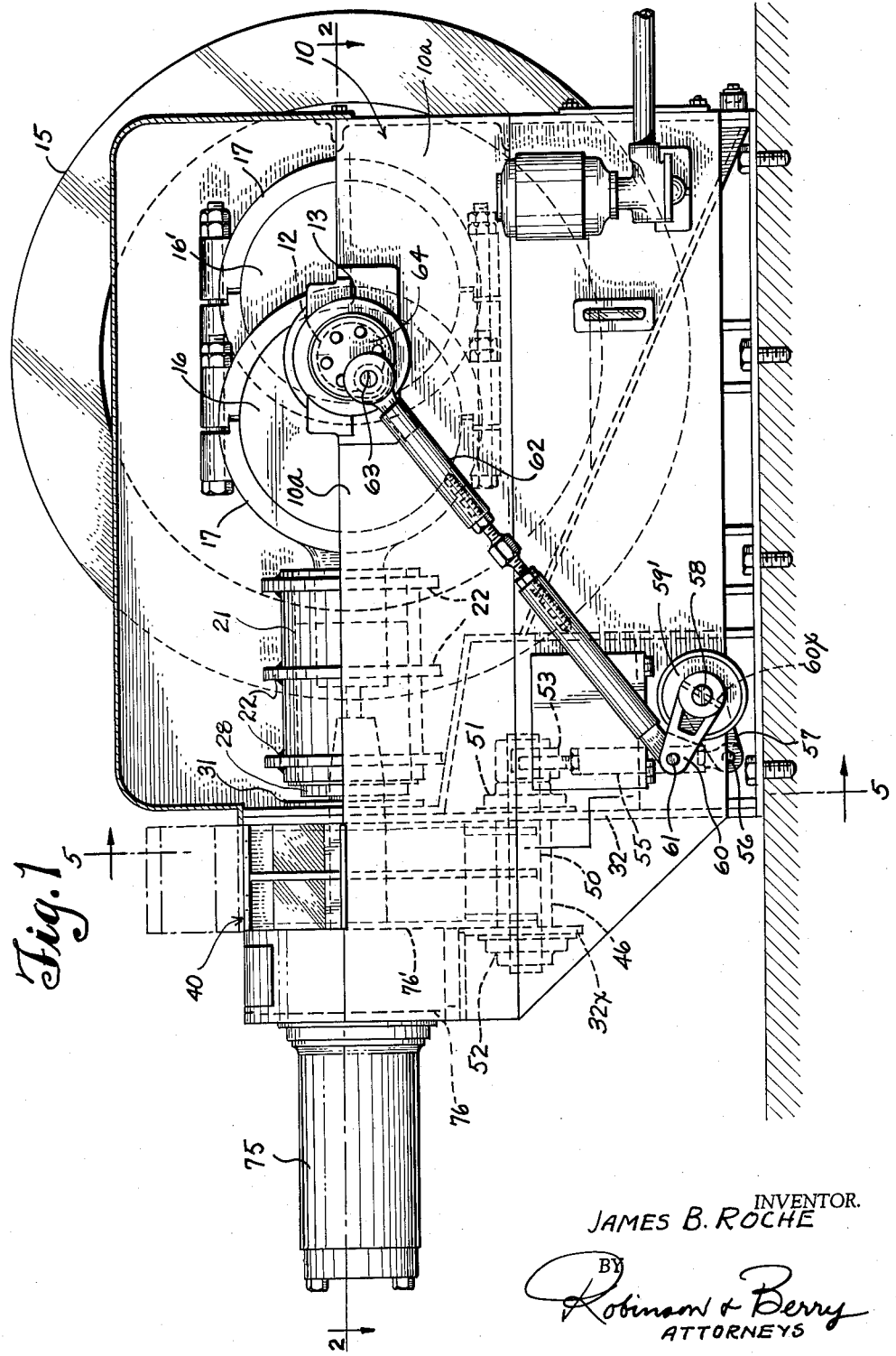

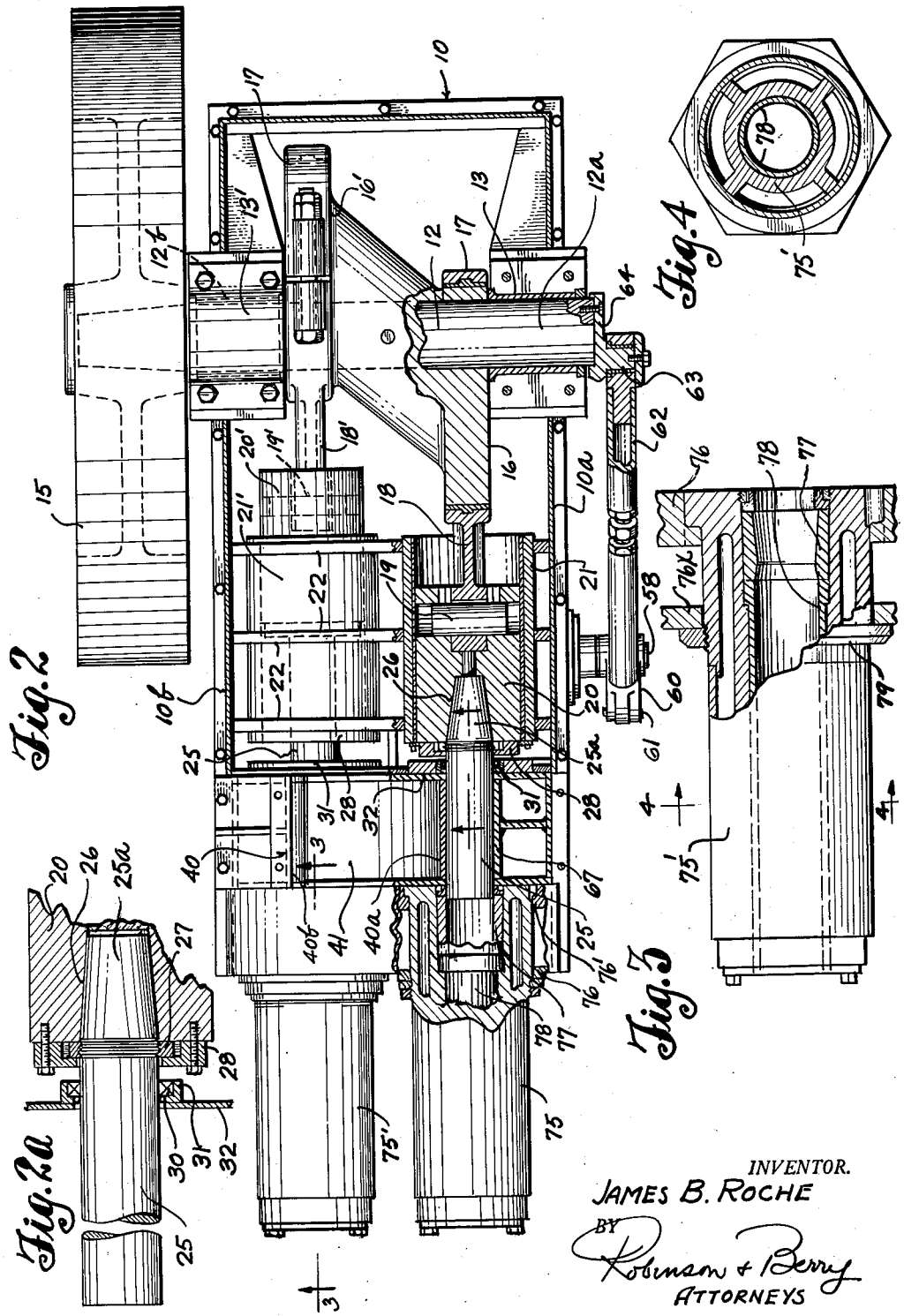

2,966,842

BRIQUETTING MACHINES

James B. Roche, Lake Stevens, Wash., assignor to Sumner Iron Works, Inc., Everett, Wash.

Filed May 5, 1958, Ser. No. 733,208

5 Claims. (Cl. 100—209)

This invention relates to a stock food briquette or wafer as manufactured from selected forage crops; to a novel method of manufacturing the briquette or wafer and to a machine for practicing the method of manufacture.

More particularly, the present invention has to do with the provision of stock feed comprising in most instances a predominating portion of chopped forage materials compressed to a form of wafers, pellets or briquettes suitable for consumption by cattle and other forage consuming animals and to the provision of a practical, high speed machine by which the present method may be economically practiced to produce the present food product in a shape, size and density that is satisfactory for its intended uses.

The principal objects of the invention are: First, to produce a briquette or wafer from chopped hay, and other selected forage crops suitable for the feeding of ruminant animals such as, for example, cattle; which product is formed by compressing the prepared materials from which it is made to a density that insures it against disintegration during shipment, storage and handling, yet is not of such density as to cause the product to be unsatisfactory for ready consumption. Second, to provide a method of manufacturing the present product that is economically feasible and which makes possible the provision of briquettes or wafers of satisfactory character from chopped forage crops, or from forage materials and other ingredients of different kinds, and to make them in different densities according to the character of and moisture content of the materials used and the requirements of the animals to which they are to be fed. Third, it is an object of the present invention to provide a practical and relatively inexpensive machine for the high speed production of briquettes or wafers in accordance with the various objects above set forth, and which is characterized by a material prepressing means comprising an oscillating and double acting sweep that facilitates the desired high speed production of the wafers by extrusion through a die, and wherein reciprocating rams operate in timing with the oscillations of the sweep to advance the charges of material as pre-pressed by the action of the sweep, into extrusion dies for their final compression or formation.

Still other objects and advantages reside in the production of a forage wafer that brings about a lessening of transportation and storage costs by reason of the reduction in volume; in the utilization of the complete forage plant by the consuming animal and in the adaptation of the product to mechanized handling.

Further objects and advantages of the invention reside in the details of construction of the various parts of the machine, in their combination and in the mode of operation of the machine as will hereinafter be described.

In accomplishing the above mentioned and other objects of the invention, I have provided the improved details of construction, the preferred forms of which are illustrated in the accompanying drawings, wherein:

Fig. 1 is a side view of a forage briquetting machine embodied by the present invention.

Fig. 2 is a horizontal section of the machine, taken substantially on the line 2—2 in Fig. 1.

Fig. 2a is an enlarged sectional detail of parts of the machine shown in Fig. 2.

Fig. 3 is a side view, partly in central section, of one of the extrusion cylinders.

Fig. 4 is a vertical cross-section, taken on line 4—4 in Fig. 3.

Fig. 5 is a vertical cross-section of the machine taken on line 5—5 in Fig. 1.

Fig. 6 is a perspective view of the oscillating sweep of the prepressing mechanism.

Fig. 7 is a fragmentary perspective view of a part of the hopper and housing of the pre-pressing mechanism.

Fig. 8 is a view illustrating an alternative form of connection between the sweep shaft actuating lever arm and the arm actuating link.

The present machine is designed primarily for the briquetting of chopped forage crops, such as hay, grasses, alfalfa, cover and the like with or without other materials, including ground grain mixtures which may be required to insure a balanced diet for the animals being fed. Also, it is anticipated that the machine can be adapted for briquetting chopped straw, wheat chaff and other reduced or chopped materials including dried sugar beet tops or pulp.

For the purpose of the following specification, the term "hay" will be used to designate any of the common and previously mentioned forage crops or mixtures of materials that may be suitably prepared for briquetting and then formed into wafers or briquettes in accordance with the teachings and objects of the present invention.

To prepare the hay for the present briquetting operation, it is first cut, chopped or is otherwise reduced to pieces of such size that they may be fed or advanced by gravity flow, manually or mechanically into the machine for briquetting in the intended way and by the means herein provided.

The machine which has herein been illustrated and which will now be described is particularly adapted for briquetting chopped hay, alfalfa, and the like. It is to be understood, however, that the material used may be a mixture of various materials and also that adjustments, modifications or alterations may be made in parts of the machine to adapt it for the briquetting of the particular material being used, without departing from the spirit of the invention.

Referring more in detail to the drawings:

The present briquetting machine is shown in Fig. 1 to comprise a housing or frame structure 10 of substantial and rigid construction, comprising opposite sidewall portions, 10a and 10b, disposed in parallel vertical planes and fixed to other frame parts as has been shown in Figs. 2 and 5; these opposite wall portions being joined in spaced relationship by opposite end walls and by crossmembers as presently explained. Supported by and extended horizontally between and beyond these sidewall portions at a location near the right hand end of the frame as seen in Fig. 1, is a cross-shaft 12 that, near its ends, comprises journals 12a and 12b that are revolubly contained in journal bearings 13 and 13' mounted by the sidewall members 10a and 10b as shown in Fig. 2. At one end, the cross-shaft 12 is equipped with a large belt wheel 15 by which it can be rotatably driven and which wheel is of such size and weight that it serves also as a fly wheel. The cross-shaft 12, hereinafter referred to as the "crank shaft," is equipped between the journals 12a and 12b with eccentrics 16—16' which are equally offset to opposite sides of the shaft at intervals of 180°. Fitted about these are the inner end straps or collars 17 of connecting rods 18—18' which, at their outer ends are pivotally connected by pins 19—19' to pistons 20 and 20' which are reciprocally contained in guide cylinders 21—21'. These cylinders are rigidly mounted at the same horizontal level and in parallel relationship by a plurality of vertical plates 22 that are disposed between and fixed to the opposite sidewall members 10a and 10b of the frame, as has been shown in Fig. 2. Also, these cylinders are coextensive, of equal size and are aligned axially, respectively, with the planes of the eccentrics 16 and 16'. Rotation of the crank shaft 12 causes reciprocal movements of the pistons in the guide cylinders 21—21' to equal extent and in unison, but in opposite directions.

Fixed in the outer end portion of each of the pistons, 20 and 20', coaxially thereof, is a cylindrical ram 25. Each ram has a conically tapered inner end portion 25a fitted in a similarly tapered socket 26 in the piston. The ram is held against release or withdrawal from the piston socket by a nut 27 that is threaded onto it as seen in Fig. 2a and which nut is enclosed by and clamped beneath a collar or ring 28 that is applied about the nut and fixed to the end of the piston.

Each of the rams 25 is of cylindrical form, and its outer end surface is here shown to be flat, smooth and in a plane that is perpendicular to the axial line of the ram, but which might be of other form, as presently explained. As the pistons reciprocate, the rams slide through wiper rings 30, shown in Fig. 2a, that are mounted in retainers 31; these retainers being fixed to a transversely directed frame plate 32 that is fixedly mounted in the housing and extends between its opposite sidewall members 10a and 10b closely adjacent the forward or outer ends of the cylinders 21—21'.

Mounted in the left hand end portion of the main frame, as disclosed in Figs. 1 and 2 is what is herein designated to be the pre-pressing mechanism, to which the chopped hay is advanced or fed and in which certain quantities thereof are formed into pre-pressed charges which charges are positioned by the pre-pressing means for advancement by the reciprocally operating rams, into compression or extrusion dies to complete their formation into wafers which progress through the dies and are discharged therefrom.

The pre-pressing mechanism comprises a hay receiving hopper 40 that is fixed in the housing between the opposite sidewall portions 10a and 10b, as best shown in Fig. 5. This housing forms a transversely directed hay receiving chamber 41 with vertical, opposite sidewalls 40a and 40b. The chamber 41 is located midway of the side members 10a—10b of the main frame and is closed at its lower end by the top member of the oscillating sweep designated in its entirety by reference numeral 45, and which has been shown apart from the machine, in Fig. 6.

The sweep 45 is of the segmental form shown in Fig. 5 and comprises a cylindrically curved segmental top wall 45x which is rigidly fixed to a hub 46 by means of front and rear end plates 47—47' and a central, longitudinal web plate 48. The axis of curvature of the plate 45x coincides with the axial line of the hub. This sweep is supported and is oscillated by a shaft 50 on which the hub 46 is fixedly mounted as shown in Fig. 5; the shaft being rotatably supported at its rearward and forward ends in bearings 51 and 52 that are fixed, respectively, to the plate 32 and a plate 32x; which plates extend transversely between and are fixed to opposite sidewall members of the main frame structure as indicated in Fig. 1.

At its rearward end, the shaft 50 has a rocker arm 53 fixed thereto and this arm has a yoke-like outer end portion 53' that is joined by a pivot pin 54 to the upper end of a link 55 which, at its lower end, is pivotally connected, as at 56, to a rocker arm 57 that is fixed to the inner end of a transversely directed rocker shaft 58 that is mounted for oscillation in bearings 59—59' fixed in the lower part of the main frame structure as shown in Fig. 5.

Shaft 58 is parallel to the crank shaft 12 and is extended at one end to the right hand side of the main frame or housing and is there equipped with a rocker lever 60. Lever 60 is pivotally connected at its outer end by a pin 61, as shown in Fig. 1, to the lower end of an upwardly and rearwardly directed link 62 of adjustable length which at its upper end is pivotally connected, as at 63, to an eccentric 64 that is fixed to that end of the crank shaft 12 which projects to that same side of the machine.

In order to prevent possible damage to the pre-pressing mechanism in the event that any large solid object, or other foreign matter should enter the press, the rocker lever 60 has been connected to the rocker shaft 58 by means of a shear pin 60x as shown in Fig. 1.

As an alternative, the shear pin can be omitted and the rocker lever 60 keyed or otherwise fixed to the rocker shaft 58 and the connecting rod 55 joined with the rocker arm 53 by a spring cushioned connection, for example, a connection like that shown in Fig. 8 wherein the upper end of the connecting rod 55 is seen to be diametrically reduced and slidable through a block 55x. Coiled springs S and S' are disposed under compression between the lower and upper faces of the block and a shoulder 55s on the rod and a nut 55n that is threaded onto its end. The block 55x is pivotally mounted in the yoke-like end portion of arm 53, by trunnions as at 55x. Still other alternatives, such as rubber or air cushions might be embodied in the connection to serve the purpose.

The connection, as made between the crank shaft 12 and rocker shaft 58 by link 62, provides that as the crank shaft rotates, the sweep 45 will be oscillated in timing therewith. In its oscillating movements, the sweep swings equally toward opposite sides of the main housing, as will be understood by reference to its showing in Fig. 5.

The cylindrically curved top wall 45x of the sweep is equipped on its top side, midway of its opposite side edges, with a cross-head 65 which is best shown in Fig. 6, comprises laterally facing semi-cylindrically curved opposite side plates 66 and 66' that are joined across their top edges by a plate 65p that is curved about the hub axis. When the sweep oscillates, these outwardly facing, cylindrically curved side plates 66—66' move toward and away from the opposedly related and similar semi-cylindrically curved plates 67—67' that are rigidly fixed in the hopper chamber 41 immediately above the path of travel of top wall 45x of the sweep and directly below the opposite sidewalls 40a and 40b of the upper chamber 41 as shown in Fig. 5. When the sweep 45 swings to its limit of travel in one direction, for example, to its full line showing in Fig. 5, the head 65 moves away from and provides a space between it and the plate 67' into which space chopped hay is fed or advanced from the hopper chamber 41. Then as the sweep moves in the opposite direction to its limit of travel, this advanced hay is formed into a pre-pressed cylindrical charge, between the coacting and opposedly faced plates 66' and 67'. Likewise, with the pre-pressing operation, hay is received between the face plates 66 and 67 and when the sweep swings to its limit in the opposite direction this charge is pre-pressed to cylindrical form.

It is further to be understood that the cylindrical, open ended pre-pressing molds, as alternately formed between the cylindrically curved plates 66'—67' and 66—67 when the sweep moves in opposite directions to its limits of travel, are axially aligned with the axes of the two rams 25—25 and that the relationship of the rams, as carried by their respective mounting pistons, is such that as a ram is moved forwardly it engages and advances the pre-pressed charge from the temporary mold corresponding thereto, into the corresponding extrusion cylinder; the two extrusion cylinders being designated in Fig. 2, in their entireties, by numerals 75 and 75'. The extrusion cylinders are fixedly mounted in axial alignment with the corresponding guide cylinders 21—21' and rams 25—25, by transversely directed frame members 76—76', shown in Figs. 1 and 2, which constitute parts of the main frame structure.

Each extrusion cylinder has a tapered tubular die 77 of predetermined inside diameter, fitted and secured in its receiving end, as shown in Fig. 3. This die engages against the end of a tubular liner 78 fixed in the cylinder and which may be tapered to more or less extent if such is desired.

The present extrusion cylinders are water jacketed as indicated in Fig. 3 in order that the wafer be kept below a predetermined temperature, above which results will be detrimental.

The extent to which the wafers are compressed is determined by or is dependent to great extent on the resistance afforded to advancement of the formed briquettes in the extrusion cylinders, and this resistance can be made more or less by use of sleeves 78 of more or less taper or length.

It has previously been mentioned that the end surfaces of the rams 25 are flat. This causes the formed end surfaces of the wafers to be flat and accordingly there will be little or no adherence between them as advanced from the extrusion cylinders. However, if for any reason it should be desired that the wafers be caused to adhere, face to face, to more or less extent and thus be extruded from the cylinders in the form of a continuous log, this can be accomplished by giving the ends of the rams a special shape or form such as, for example, a conical taper, or to provide the flat end surface with a projecting boss that will cause a socket or recess in the formed face of each wafer into which material of the next formed wafer will be received to form an interlock that results in the log formation.

Assuming that the machine is so constructed and that the hopper contains a supply of chopped hay and that suitable means also has been provided for causing the proper down feeding of this hay into the hopper chamber 41', the mode of operation for making of the present wafers and extruded briquettes is as follows:

The crank shaft 12 is caused to be rotatably driven by suitable means such as, for example, a belt applied about the belt wheel 15. With rotation of the crank shaft, the rams 25—25' are caused to be reciprocally actuated and the sweep 45 to be oscillated in timing therewith. With each movement of the sweep, from one limit of travel to the other, a charge of hay received between the sweep head 65 and the mold plate 67 or 67' toward which the head is moving, is pre-pressed to cylindrical form. As the sweep head moves to its end of travel, the corresponding ram 25 simultaneously moves into the mold and pushes the compressed charge endwise into the receiving end of the corresponding extrusion or compression cylinder 75 or 75' through the die 77 and into the sleeve 78.

It has been found desirable to reduce the material that is to be formed into wafers to a moisture content below 20%. If it is above that percentage, the density of the wafer is too great for easy consumption by the animal. Moisture content and heat have an important bearing on the character of the finished product.

As the pre-pressed charges are successively received in an extrusion cylinder they are advanced end to end and due to added resistance against advancement as provided by the sleeve 78 are caused to be compressed or compacted to greater extent and also to be reduced in thickness. As presently being manufactured, the wafers are approximately four inches in diameter and are reduced by compressing in the extrusion cylinder to approximately one inch in thickness.

It is to be understood that such wafers may be made smaller or larger in diameter, and may be made in various thickness depending on the product desired and animal to be fed therewith. The thickness of the wafers will be governed to some extent by the forage material being used, and also by the resistance to its advancement through the extrusion cylinders.

What I claim as new is:

1. A briquetting machine comprising a feed hopper, a fixed pre-pressing chamber below said hopper, a pair of laterally spaced extrusion dies extending from one end of said pre-pressing chamber, a ram for each die reciprocally mounted on the opposite side of the pre-pressing chamber and adapted to move pre-pressed material from said pre-pressing chamber into and through said extrusion dies, said pre-pressing chamber including vertically disposed and laterally spaced plates mounted in fixed position and opposite sides of said pre-pressing chamber, an oscillating shaft horizontally disposed and mounted in fixed position below said plates and medially of said pre-pressing chamber, a pre-pressing head mounted in fixed position on said shaft and having a portion which extends upwardly between said plates, power means interconnected with said shaft for oscillating said shaft whereby said upwardly extending head portion moves alternately from one plate to the other and power means for reciprocally actuating said rams in timed sequence with the movement of said head to move the pre-pressed charges of material into said dies.

2. A briquetting machine as in claim 1 wherein the width of a portion of said pre-pressing head is greater than the distance between said plates.

3. A briquetting machine comprising a pair of parallel, laterally spaced extrusion dies, a material feed hopper common to both dies, a ram associated with each die and mounted for reciprocal action within the hopper in axial alignment with the respective dies, a crank-shaft mounted transversely of the lines of reciprocation of said rams and operatively connected therewith to cause reciprocation of the rams in unison in opposite directions, pre-pressing plates in parallel, fixed position in the hopper at opposite sides thereof, a material pre-pressing head disposed in the hopper between said plates, a horizontal shaft supporting said pre-pressing head for oscillation, alternately toward and from said plates and to coact with said plates for pre-pressing of the material received from the hopper, a rocker lever fixed to said horizontal shaft, an oscillating rocker shaft mounted parallel with said crank shaft, rocker arms interconnected to the opposite ends of said rocker shaft, a link connecting said rocker lever and one of said rocker arms, an eccentric fixed on said crank shaft, and a link connecting said eccentric with the other of the rocker arms.

4. A briquetting machine as in claim 3 wherein the link connected to the eccentric is adjustable in length.

5. A briquetting machine as in claim 3 wherein said rocker lever is resiliently interconnected to said rocker arm.

References Cited in the file of this patent

UNITED STATES PATENTS

| | | |
|---|---|---|
| 751,752 | Pilliod | Feb. 9, 1904 |
| 2,760,429 | Skromme | Aug. 28, 1956 |
| 2,810,181 | Ruckstuhl | Oct. 22, 1957 |

FOREIGN PATENTS

| | | |
|---|---|---|
| 476,012 | Germany | May 10, 1929 |
| 519,850 | Italy | June 24, 1955 |